(12) United States Patent
Kanagovi et al.

(10) Patent No.: US 11,281,517 B2
(45) Date of Patent: Mar. 22, 2022

(54) SYSTEM AND METHOD FOR RESOLVING ERROR MESSAGES IN AN ERROR MESSAGE REPOSITORY

(71) Applicant: EMC IP Holding Company LLC, Hopkinton, MA (US)

(72) Inventors: Ramakanth Kanagovi, Bangalore (IN); Ankur Gupta, Bengaluru (IN); Aurosikha, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/994,435

(22) Filed: Aug. 14, 2020

(65) Prior Publication Data

US 2022/0050738 A1 Feb. 17, 2022

(51) Int. Cl.
| | |
|---|---|
| *G06F 11/00* | (2006.01) |
| *G06F 11/07* | (2006.01) |
| *G06F 11/30* | (2006.01) |
| *G06F 11/14* | (2006.01) |
| *G06F 11/32* | (2006.01) |
| *G06F 11/22* | (2006.01) |

(52) U.S. Cl.
CPC ...... *G06F 11/0784* (2013.01); *G06F 11/0772* (2013.01); *G06F 11/0775* (2013.01); *G06F 11/0781* (2013.01); *G06F 11/0787* (2013.01); *G06F 11/1453* (2013.01); *G06F 11/1469* (2013.01); *G06F 11/2252* (2013.01); *G06F 11/3072* (2013.01); *G06F 11/327* (2013.01)

(58) Field of Classification Search
CPC ............. G06F 11/0775; G06F 11/0781; G06F 11/2252; G06F 11/2257; G06F 11/3072; G06F 11/3075
See application file for complete search history.

(56) References Cited

U.S. PATENT DOCUMENTS

| | | | |
|---|---|---|---|
| 9,843,472 B1* | 12/2017 | Cogan | H04M 15/70 |
| 2014/0122932 A1* | 5/2014 | Chen | G06F 11/0706 714/37 |
| 2019/0205195 A1* | 7/2019 | Tee | G06F 11/076 |
| 2021/0064500 A1* | 3/2021 | Przestrzelski | G06F 11/0754 |

* cited by examiner

*Primary Examiner* — Marc Duncan
(74) *Attorney, Agent, or Firm* — Chamberlain, Hrdlicka, White, Williams & Aughtry

(57) ABSTRACT

A method for managing error messages includes obtaining, by a message resolution manager, a plurality of error messages, performing an error message consecutive deduplication on the plurality of error messages to obtain a plurality of deduplicated error messages, generating a plurality of message sequences using the plurality deduplicated error messages, applying a message sequence frequency algorithm to the plurality of message sequences to obtain a high severity message sequence list, and initiating an error message resolution on at least one message sequence specified in the high severity message sequence list.

14 Claims, 9 Drawing Sheets

| Error Message Repository 400 ||||
| --- | --- | --- | --- |
| Client Device Identifier | Error Message Identifier | Error Message Code | Timestamp |
| C1 | MA1 | 8740 | T1 |
| C2 | MA2 | 8740 | T2 |
| C1 | MA3 | 1342 | T3 |
| C1 | MA3 | 1342 | T4 |
| C1 | MA3 | 1342 | T5 |
| C2 | MA4 | 9942 | T6 |
| C2 | MA5 | 2457 | T7 |
| C2 | MA5 | 2457 | T8 |
| C2 | MA5 | 2457 | T9 |
| C1 | MA6 | 8740 | T10 |
| C1 | MA7 | 1342 | T11 |
| C1 | MA7 | 1342 | T12 |

FIG. 4A

| Sequence Frequency Track Mapping 420 |||||
| --- | --- | --- | --- | --- |
| Sequence ID | 8740 Frequency | 1342 Freq. | 9942 Freq. | 2457 Freq. |
| SQA | 2 | 1 | 0 | 0 |
| SQB | 0 | 0 | 1 | 1 |
| SQC | 1 | 1 | 0 | 0 |

FIG. 4B

SYSTEM AND METHOD FOR RESOLVING ERROR MESSAGES IN AN ERROR MESSAGE REPOSITORY

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing virtual machine restorations in accordance with one or more embodiments of the invention. The method includes obtaining, by a message resolution manager, a plurality of error messages, performing an error message consecutive deduplication on the plurality of error messages to obtain a plurality of deduplicated error messages, generating a plurality of message sequences using the plurality deduplicated error messages, applying a message sequence frequency algorithm to the plurality of message sequences to obtain a high severity message sequence list, and initiating an error message resolution on at least one message sequence specified in the high severity message sequence list.

In one aspect, the invention relates to a non-transitory computer readable medium in accordance with one or more embodiments of the invention, which includes computer readable program code, which when executed by a computer processor enables the computer processor to perform a method for performing virtual machine restorations. The method includes obtaining, by a message resolution manager, a plurality of error messages, performing an error message consecutive deduplication on the plurality of error messages to obtain a plurality of deduplicated error messages, generating a plurality of message sequences using the plurality deduplicated error messages, applying a message sequence frequency algorithm to the plurality of message sequences to obtain a high severity message sequence list, and initiating an error message resolution on at least one message sequence specified in the high severity message sequence list.

In one aspect, the invention relates to a system in accordance with in one or more embodiments of the invention, which includes a processor and memory that includes instructions, which when executed by the processor, perform a method. The method includes obtaining, by a message resolution manager, a plurality of error messages, performing an error message consecutive deduplication on the plurality of error messages to obtain a plurality of deduplicated error messages, generating a plurality of message sequences using the plurality deduplicated error messages, applying a message sequence frequency algorithm to the plurality of message sequences to obtain a high severity message sequence list, and initiating an error message resolution on at least one message sequence specified in the high severity message sequence list.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 4A-4C show an example in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a production host environment. Specifically, embodiments of the invention may manage the production host environment by analyzing error messages obtained from a client(s) (or another entity in the system), deduplicating repetitive error messages, generating message sequences of sequential messages, analyzing the message sequences to obtain a list of high severity message sequences, and servicing the messages. Embodiments of the invention may utilize machine learning to improve the analysis of future error messages and message sequences. The improvement of the analysis may improve the future servicing of the error messages.

Figure 1A:
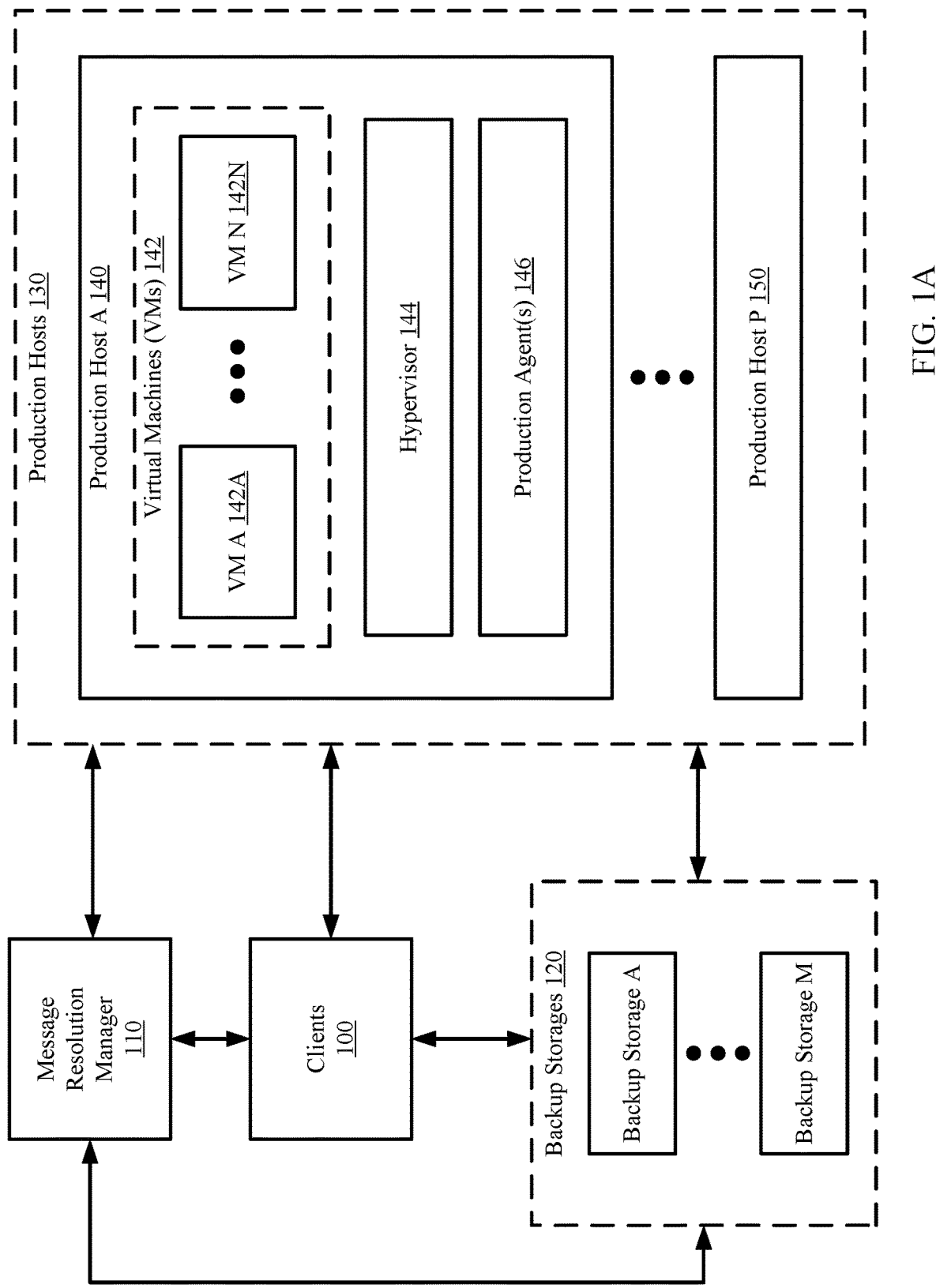
FIG. 1A shows a diagram of a system in accordance with one or more embodiments of the invention.

FIG. 1A shows an example system in accordance with one or more embodiments of the invention. The system includes a message resolution manager (110), one or more clients (100), one or more production hosts (130) and backup storages (120). The system may include additional, fewer, and/or different components without departing from the invention. Each component may be operably connected to any of the other components via any combination of wired and/or wireless connections. Each component illustrated in FIG. 1A is discussed below.

In one or more embodiments of the invention, the message resolution manager (110) manages the resolution of issues (also referred to as errors) occurring in the production hosts (130), the clients (100), and/or the backup storages (120). The message resolution manager may manage the resolution of the issues by managing an error message repository (discussed below) that specifies the issues. The message resolution manager (110) may manage the resolution by performing the methods illustrated in FIGS. 3A and 3B.

Figure 5:
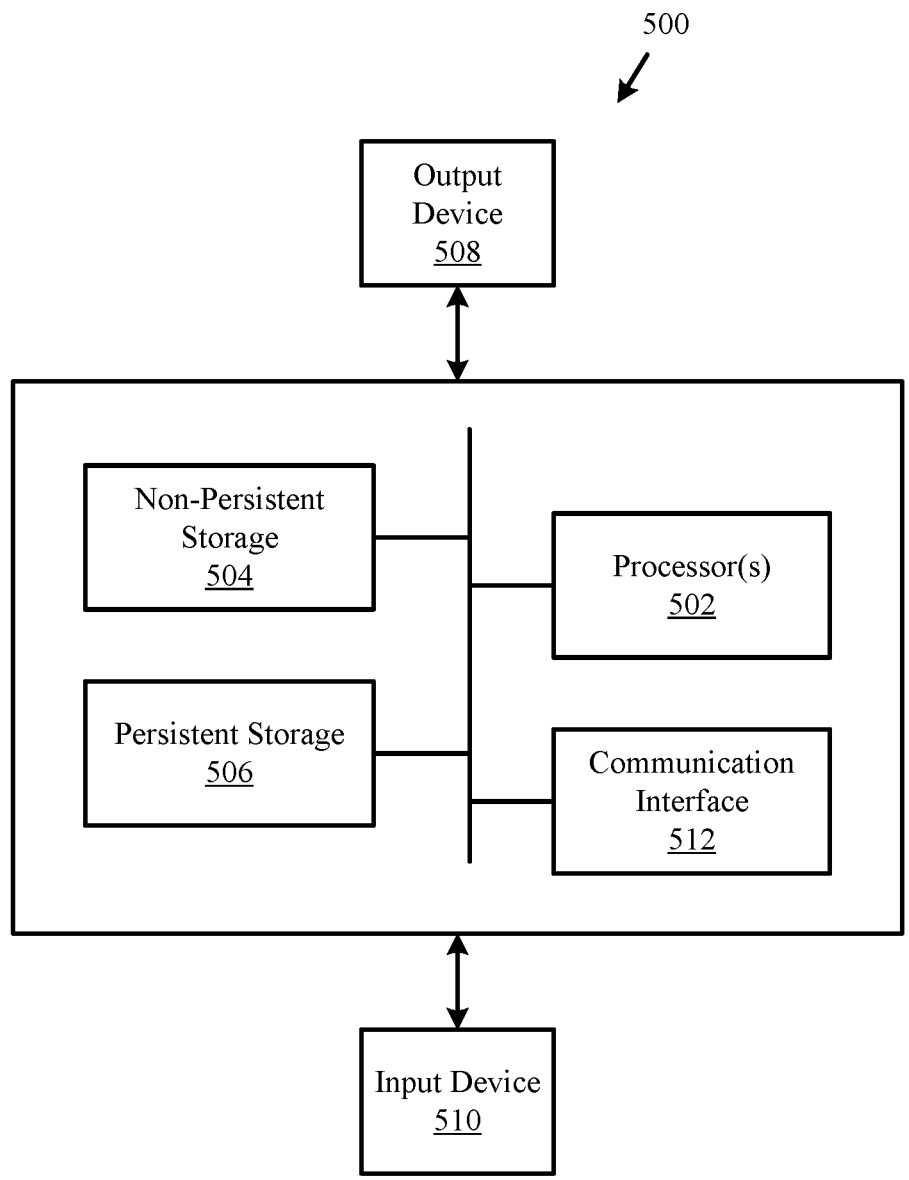
FIG. 5 shows a diagram of a computing device in accordance with one or more embodiments of the invention.

In one or more embodiments of the invention, the message resolution manager (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the message resolution manager (110) described throughout this application and/or all, or a portion thereof, of the methods illustrated in FIGS. 2A-2B.

In one or more embodiments of the invention, the message resolution manager (110) is implemented as a logical device. The logical device may utilize the computing resources of any number of computing devices and thereby provide the functionality of the message resolution manager (110) described throughout this application and/or all, or a portion thereof, of the methods illustrated in FIGS. 2A-2B. For additional details regarding the message resolution manager, see, e.g., FIG. 1B.

In one or more embodiments of the invention, the production hosts (130) host virtual machines (VMs) (142). The VMs (142) may be logical entities executed using computing resources (not shown) of the production host (130). Each of the virtual machines (142A, 142N) may be performing similar or different processes. In one or more embodiments of the invention, the VMs (142) provide services to users, e.g., clients (not shown). For example, the VMs (142) may host components. The components may be, for example, instances of databases, email servers, and/or other applications. The VMs (142) may host other types of components without departing from the invention.

In one or more embodiments of the invention, the production hosts (130) each include a hypervisor (144) that orchestrates the operation of the VMs (142). The hypervisor (144) may orchestrate the operation of the VMs (142) by allocating computing resources to each virtual machine (142A, 142N).

Further, the hypervisor (144) may provide information about the virtual machines (142) of a production host (e.g., 140) to the message resolution manager (110) as requested by the message resolution manager (110), during periodic intervals, after a change in the system is detected by the hypervisor (144), and/or based on any other occurrence without departing from the invention.

In one or more embodiments of the invention, the hypervisor (144) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (144) described throughout this application.

In one or more of embodiments of the invention, the hypervisor (144) is implemented as computer instructions, e.g., computer code, stored on a persistent storage that when executed by a processor of the production host (140) cause the production host (140) to provide the functionality of the hypervisor (144) described throughout this application.

In one or more embodiments of the invention, the production host (140) includes one or more production agents (146). A production agent may include functionality for generating backups of one or more virtual machines (142A, 142N), storing the backups in the backup storages (120), and/or obtaining the backups from the backup storages (120) when restoring the virtual machines (142A, 142N).

In one or more embodiments of the invention, the production agent (146) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (146) described throughout this application.

In one or more of embodiments of the invention, the production agent (146) is implemented as computer instructions, e.g., computer code, stored on a persistent storage that when executed by a processor of the production host (140) cause the production host (140) to provide the functionality of the production agent (146) described throughout this application.

In one or more embodiments of the invention, the virtual machines (142) are implemented as computer instructions, e.g., computer code, stored on a persistent storage (e.g., on a production host (140)) that when executed by a processor(s) of the production host (140) cause the production host (140) to provide the functionality of the virtual machines (142) described throughout this application.

In one or more embodiments of the invention, each of the production hosts (140, 150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (140, 150) described throughout this application.

In one or more embodiments of the invention, each of the production hosts (140, 150) is implemented as a logical device. The logical device may utilize the computing resources of any number of computing devices and thereby provide the functionality of the production host (140, 150) described throughout this application.

In one or more embodiments of the invention, the backup storages (120) store backups of the virtual machines (142). The backup storages (120) may communicate with the production agents (e.g., 146) of each production host when obtaining backups to be stored and/or when transferring backups to the production hosts (130) when restoring virtual machines.

In one or more embodiments of the invention, a backup is a copy of data associated with a virtual machine. A backup may further include additional data that enables a production agent to restore a virtual machine associated with the backup from any production host.

In one or more embodiments of the invention, each of the backup storages (120) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage described throughout this application.

In one or more embodiments of the invention, each of the backup storages (120) is implemented as a logical device. The logical device may utilize the computing resources of any number of computing devices and thereby provide the functionality of the backup storage described throughout this application.

Figure 1B:
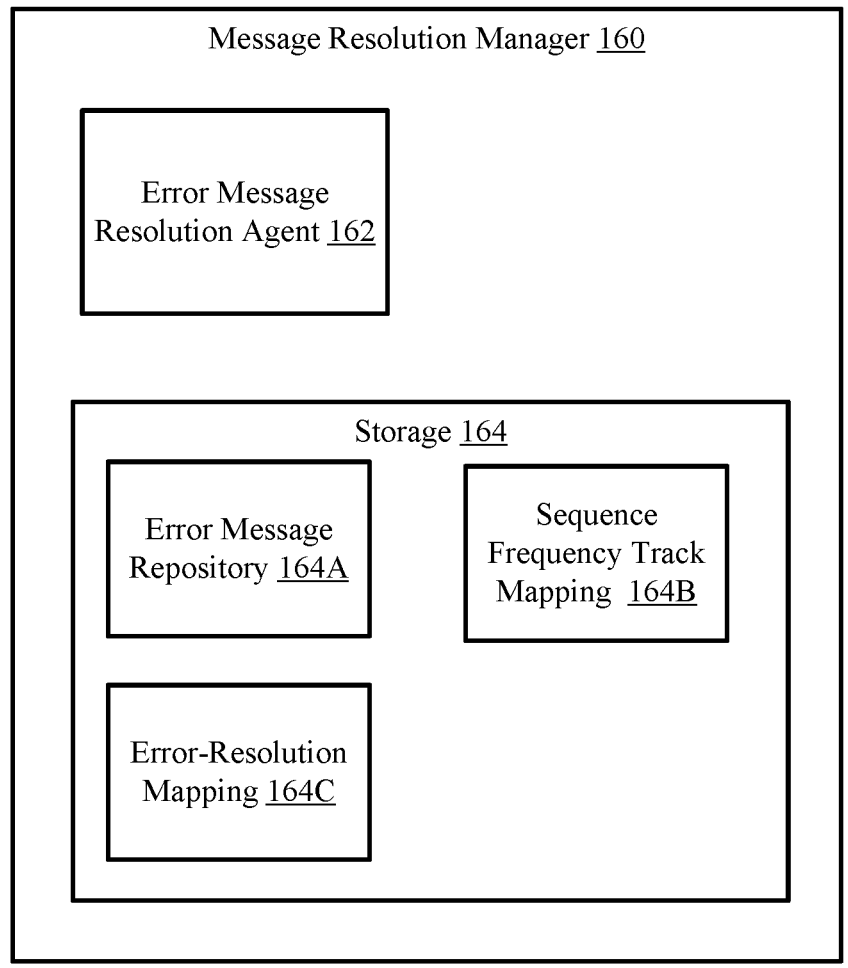
FIG. 1B shows a diagram of a message resolution manager in accordance with one or more embodiments of the invention.

FIG. 1B shows a diagram of a message resolution manager. The message resolution manager (160) may be similar to the message resolution manager (110, FIG. 1A) discussed above. As discussed above, the message resolution manager (160) includes functionality for managing resolutions of errors. To perform the aforementioned functionality, the message resolution manager (160) may include an error message resolution agent (162) and a storage (164). The message resolution manager (160) may include additional, fewer, and/or different components without departing from the invention. Each of the aforementioned components of the message resolution manager (160) is discussed below.

The error message resolution agent (162) may include functionality for obtaining error messages an error message repository (e.g., 164A) from a client or from another entity in the system of FIG. 1A. The error message resolution agent (162) may perform the method of FIG. 3A-3B to perform the aforementioned functionality.

Figure 3A:
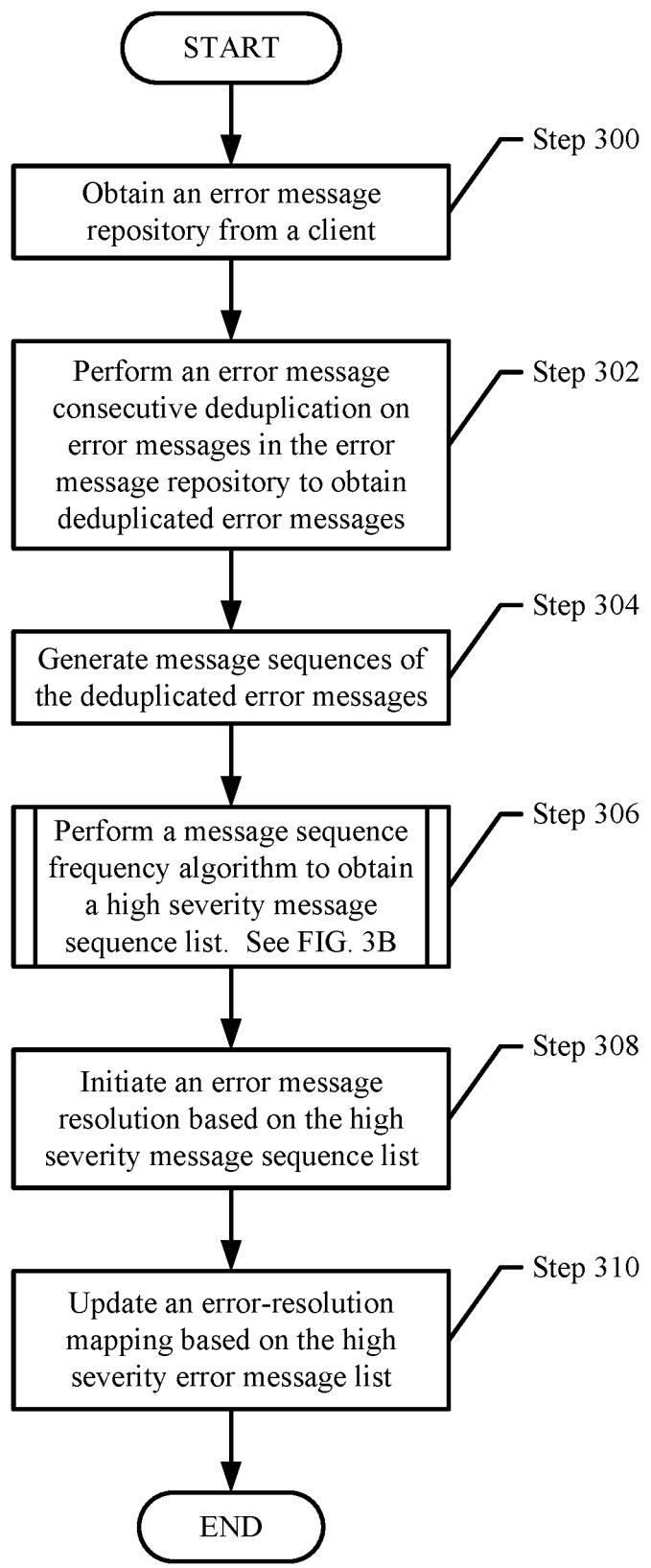
FIG. 3A shows a flowchart for managing an error message repository in accordance with one or more embodiments of the invention.
Figure 3B:
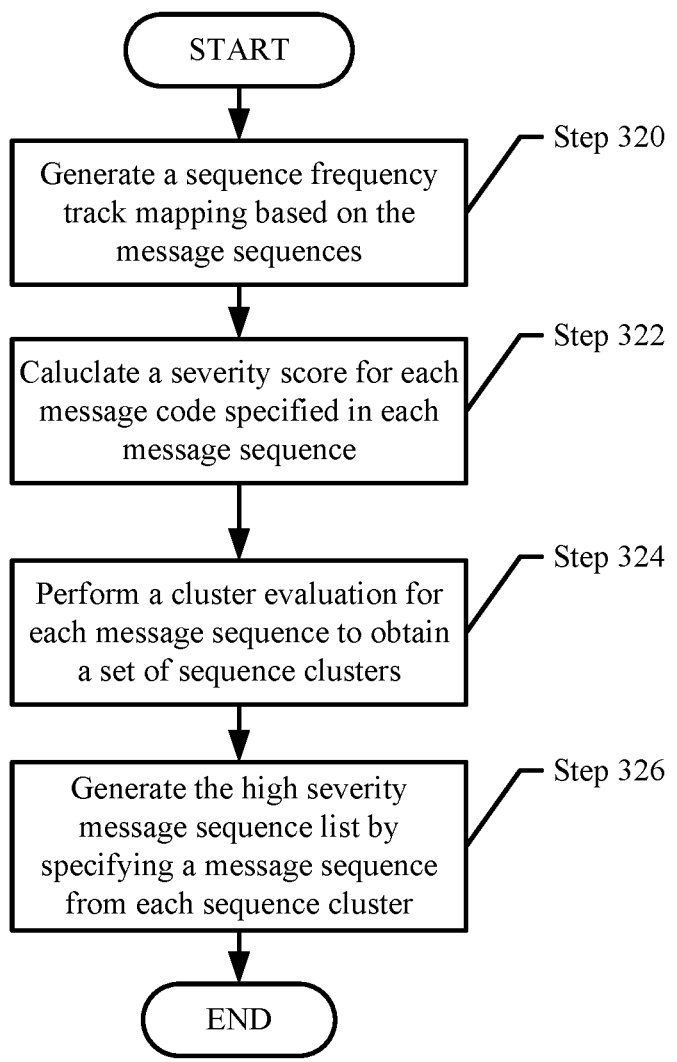
FIG. 3B shows a flowchart for performing a message sequence frequency algorithm in accordance with one or more embodiments of the invention.

In one or more of embodiments of the invention, the error message resolution agent (162) is implemented as computer instructions, e.g., computer code, stored on a persistent storage that when executed by a processor of the message resolution manager (160) causes the message resolution manager (160) to provide the functionality of the error message resolution agent (162) described throughout this application and/or all, or a portion thereof, of the method illustrated in FIGS. 3A-3B.

The storage (164) may store data structures such as, for example, an error message repository (164A), a sequence frequency track mapping (164B), and an error-resolution mapping (164C). The storage (164) may include additional, fewer, and/or different data structures without departing from the invention. Each of the aforementioned data structures is discussed below.

In one or more embodiments of the invention, the error message repository (164A) stores error messages obtained from the clients (or other entities in the system of FIG. 1A). The error message repository may store consecutive, repeating messages. The error messages may be stored in an order based on the content of the error messages (e.g., in chronological order). For additional details regarding the error message repository (164A), see, e.g., FIG. 2A.

In one or more embodiments of the invention, the sequence track mapping (164B) specifies message sequences of error messages obtained from the error message repository and specifies the frequency in which each error code (discussed below in FIG. 2A) of an error message is specified in a message sequence. In one or more embodiments of the invention, a message sequence is a grouping of consecutive, deduplicated error messages. The message sequences may be grouped based on the deduplication performed on the error messages.

For example, the error message repository may include message A1, A2, A3, a second copy of A3, A4, and A5. After a deduplication is performed, the second copy of A3 is removed. The message sequences may be grouped based on a start error message and an end error message in which no intermediate messages are associated with a copy of the error message. In this example, A1, A2, and A3 may be a first message sequence, and A4 and A5 include the second message sequence. The frequency in which each deduplicated error message is specified in a message sequence may be specified in the sequence frequency track mapping (164B). For additional details regarding the sequence frequency track mapping, see, e.g., FIG. 2B.

In one or more embodiments of the invention, the error-resolution mapping (164C) is a data structure that specifies a mapping between an error message code and a potential solution to the error. For example, the error message may specify an error message code associated with a failure during a backup operation of a set of virtual machines in a production host. The solution may include re-initiating the backup operation. Each error message code may be associated to at least one solution as specified in the error-solution mapping.

Figure 2A:
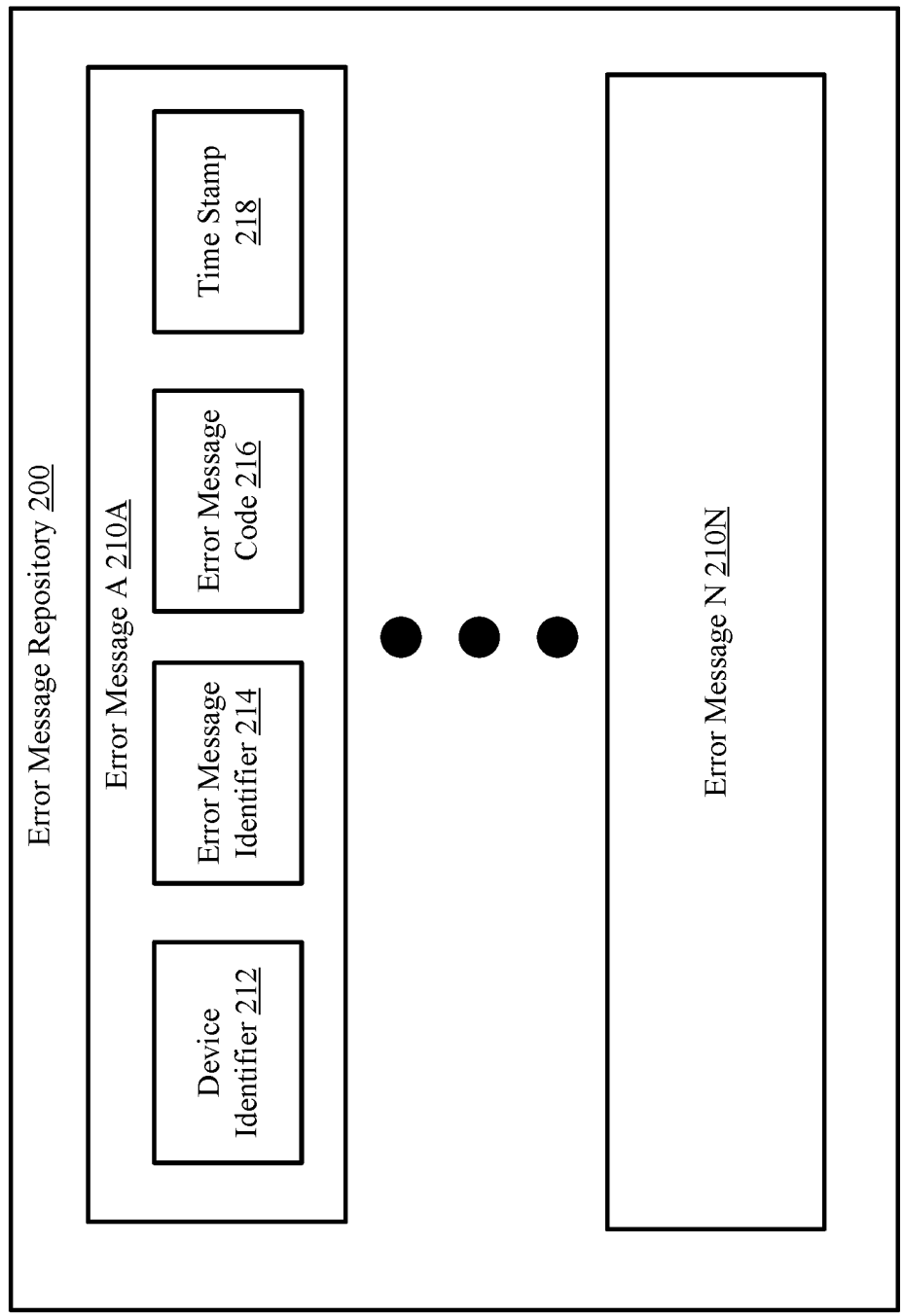
FIG. 2A shows a diagram of an error message repository in accordance with one or more embodiments of the invention.

FIG. 2A shows a diagram of an error message repository (200). The error message repository (200) may be an embodiment of the error message repository (164A, FIG. 1B) discussed above. The error message repository (200) may include one or more error messages (210A, 210N). Each error message (210A, 210N) may include a device identifier (212), an error message identifier (214), an error message code (216), and a timestamp (218). The error message repository (200), and/or error messages (210A, 210N) may include additional, fewer, and/or different portions without departing from the invention. Each of the aforementioned portions of an error message (e.g., 210A, 210N) illustrated in FIG. 2A is discussed below.

In one or more embodiments of the invention, a device identifier (212) specifies the device associated with the error message. The device may be, for example, a client device, a production host, a backup storage, and/or a virtual machine operating in a production host. The device identifier may be any combination of letters, numbers, and/or symbols that uniquely identify the device.

In one or more embodiments of the invention, the error message information (214) is a combination of letters, numbers, and/or symbols associated with the error message type of the error message (210A, 210N) for a device. In one or more embodiments of the invention, the error message identifier (214) of an error message (210A, 210N) is used to determine whether the error message (210A, 210N) is a copy (also referred to as a duplicate) of another error message (210A, 210N). Specifically, if two error messages specify identical error message identifiers in a consecutive order (e.g., the two error message codes follow each other in the error message repository (200), the error message with the later timestamp (218) is deemed the duplicate error message.

In one or more embodiments of the invention, the error message code (216) is a combination of numbers, letters, and/or symbols that uniquely identify the error message code. The error message code may be used to determine a solution to solve the error based on an error resolution mapping.

In one or more embodiments of the invention, the timestamp (218) is a combination of numbers, letters, and/or symbols that specifies a point in time associated with the error message (210A, 210N). The point in time may be, for example, the point in time in which the error message is generated, the point in time in which an error of the error message is identified, or a point in time in which the error message is obtained by the message resolution manager.

Figure 2B:
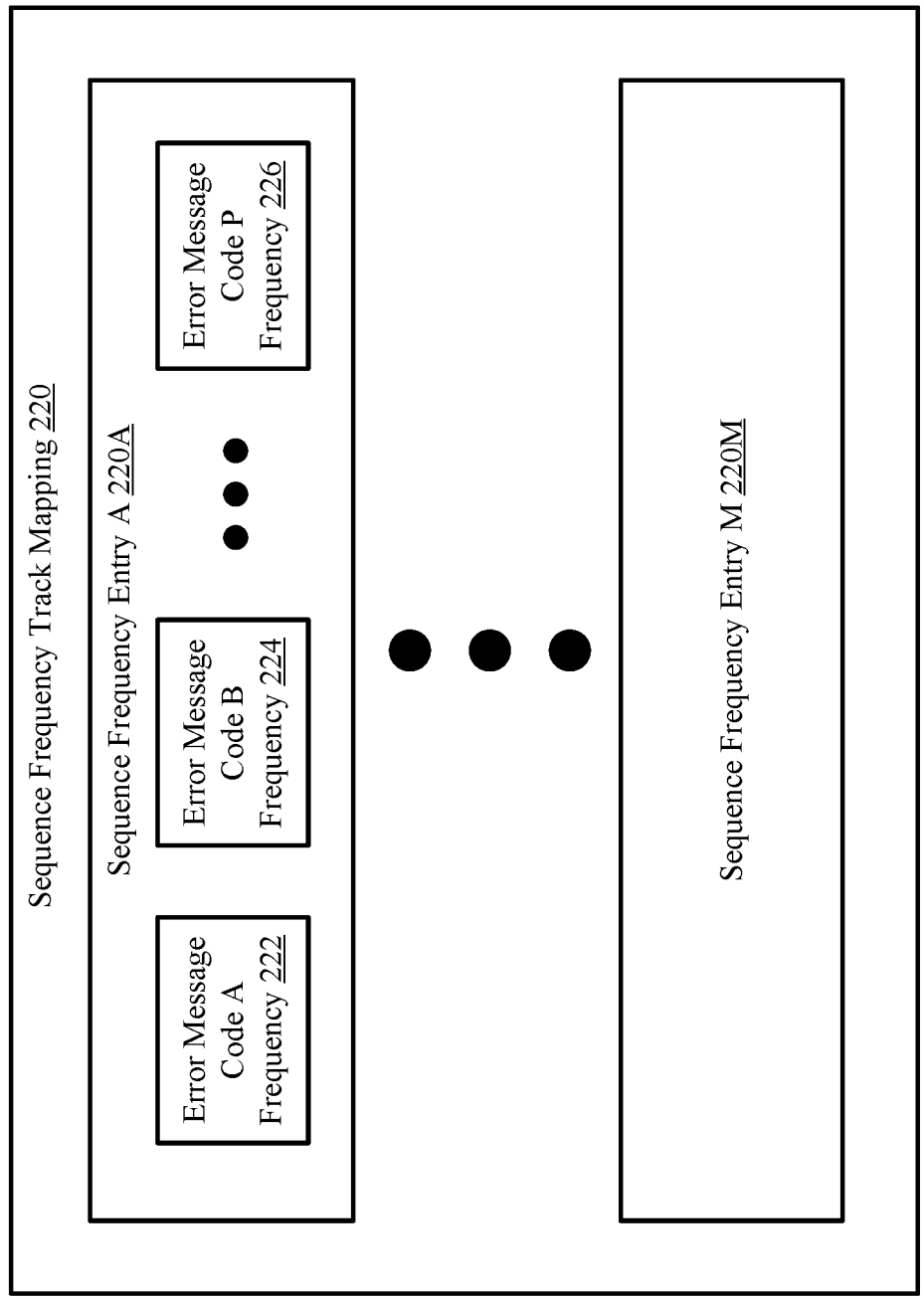
FIG. 2B shows a diagram of a sequence frequency track mapping in accordance with one or more embodiments of the invention.

FIG. 2B shows a diagram of a sequence frequency track mapping (220). The sequence frequency track mapping (220) may be an embodiment of the sequence frequency track mapping (164B, FIG. 1B) discussed above. The sequence frequency track mapping (220) may include one or more sequence frequency entries (220A, 220M). Each sequence frequency entry (220A, 220M) may specify one or more error message code frequencies (222, 224, 226). Each sequence frequency entry (220A, 220M) may be associated with a message sequence.

In one or more embodiments of the invention, the error message code frequencies (222, 224, 226) is a value that specifies a frequency in which an error message code is specified by error messages in the message sequences. As discussed above, a message sequence is a grouping of deduplicated error messages. While each deduplicated error message may include a unique error message identifier, one or more deduplicated error messages may share identical error message identifiers. The frequency in which each error message code is specified by error messages in an error message sequence may be specified by error message code frequencies (222, 224, 226).

FIGS. 3A-3B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3B may be performed in parallel with any other steps shown in FIGS. 3A-3B without departing from the scope of the invention.

FIG. 3A shows a flowchart for managing an error message repository in accordance with one or more embodiments of the invention. The method shown in FIG. 3A may be performed by, for example, a message resolution manager (110, FIG. 1A). Other components of the system illustrated in FIG. 1A may perform the method of FIG. 3A without departing from the invention.

Turning to FIG. 3A, in step 300, an error message repository is obtained. The error message repository may be obtained from a client, a production host, a backup storage, or from any other device or component in the system of FIG. 1A. The error message repository may include a set of one or more error messages.

In step 302, an error message consecutive deduplication is performed on error messages specified in the error message repository to obtain deduplicated error messages. In one or more embodiments of the invention, the error message consecutive deduplication includes analyzing the error message identifiers to determine whether any error message identifiers repeat. Specifically, each error message is analyzed to determine whether a second error message specifies an identical error message identifier. If two or more error messages specify an identical error message identifier, each of those error messages except for the error message with the oldest timestamp is deleted. The error message consecutive deduplication may be performed on all error messages in the error message repository until a set of deduplicated error messages is obtained. Each deduplicated error message in the set of deduplicated error messages may include a unique error message identifier not specified in another deduplicated error messages in the set.

In step 304, message sequences of the deduplicated messages are generated. In one or more embodiments of the invention, each message sequence includes a grouping of consecutive deduplicated error messages. The consecutive deduplicated error messages may include a timestamp during a period in time in which no error messages were deleted as a result of the error message consecutive deduplication.

In step 306, a message sequence frequency algorithm is performed to obtain a high severity message sequence list. In one or more embodiments of the invention, the message sequence frequency algorithm is a process for reducing the number of error messages (or error message sequences) based on the frequency of the error messages in each message sequence.

The result of the message sequence frequency algorithm is a high severity message sequence list. The high severity error message sequence list is a list of message sequences determined, based on the message sequence frequency algorithm, to be message sequences that require the most attention by the message resolution manager during an error message resolution.

In one or more embodiments of the invention, the message sequence frequency algorithm is performed via the method illustrated in FIG. 3B. The message sequence frequency algorithm may be performed via other methods without departing from the invention.

In step 308, an error message resolution is initiated based on the high severity message sequence list. In one or more embodiments of the invention, the error message resolution includes identifying the error messages specified in each message sequence in the high severity message sequence list, and using an error-resolution mapping to identify a potential solution to each error in the error messages. The error message resolution may be an action (or a series of actions) performed by the message resolution manager to resolve the error specified in each error message of the message sequences.

For example, resolution to an error that includes a failed storage of an index used for a backup operation of the virtual machines in the production host may include reserving disk space for the production agent(s) performing the backup operations to re-generate the index. Other resolutions may be performed for this error without departing from the invention.

In one or more embodiments of the invention, the error resolution may be initiated by contacting a client about the error. The client may respond with a series of actions aimed at resolving the issues. The client may further notify the message resolution manager with the implemented series of actions and specify whether the series of actions resolved the issue.

In step 310, an error-resolution mapping is updated based on the high severity error message list. In one or more embodiments of the invention, the error resolution mapping is updated based on the response by the client in performing a series of actions to resolve any of the errors as initiated by the message resolution manager. The error-resolution mapping may be updated by identifying the error message code and modifying the mapped resolutions to specify the series of actions performed by the client if the series of actions resulted in the error being resolved. Each error message code that may benefit from the update may be updated in accordance with the response from the client.

FIG. 3B shows a flowchart for performing a message sequence frequency algorithm in accordance with one or more embodiments of the invention. The method shown in FIG. 3B may be performed by, for example, a message resolution manager (110, FIG. 1A). Other components of the system illustrated in FIG. 1A may perform the method of FIG. 2B without departing from the invention.

In step 320, a sequence frequency track mapping is generated based on the message sequences. In one or more embodiments of the invention, the sequence frequency track mapping is generated by generating a sequence entry for each message sequence generated in step 304. The sequence entry of a message sequence may be populated by specifying a number of instances in which each error message code is specified by an error message in the message sequence. Each sequence entry in the sequence frequency track mapping may be populated accordingly.

In step 322, a severity score is generated for each message code specified in each message sequence. In one or more embodiments of the invention, the severity score for an error message of a message sequence is calculated using a function (or a combination of functions) that uses inputs that may include, for example, the error message code frequency (or frequencies) of the error message code of the message sequence, the total number of message sequences, and/or the number of unique error codes specified in the message sequence. Other inputs may be used to generate the severity score without departing from the invention.

In step 324, a cluster evaluation for each message sequence is performed to obtain a set of sequence clusters. In one or more embodiments of the invention, the cluster evaluation is performed using the generated severity scores in step 322. The cluster evaluation includes grouping the message sequences into sequence clusters. Each sequence cluster may include one or more message sequences.

The grouping of the sequence clusters may be determined based on the generated severity scores and a clustering mechanism applied to the message sequences. The clustering mechanism may be, for example, a K-means clustering. In one or more embodiments of the invention, the K-means clustering is a mechanism for classifying items based on properties of the items. The items may be the message sequences. The properties may include, for example, the severity scores of each error message code in each message sequence. Other clustering mechanisms may be applied without departing from the invention.

In step 326, the high severity message sequence list is generated by selecting a message sequence from each sequence cluster. In one or more embodiments of the invention, a message sequence from each sequence cluster may be selected by implementing a secondary function (or set of functions) on the message sequences that utilizes, as inputs to the functions, the severity scores of the error message codes and/or the error message code frequencies of each error message codes. Other inputs may be applied to the function without departing from the invention.

Example

Figure 4C:
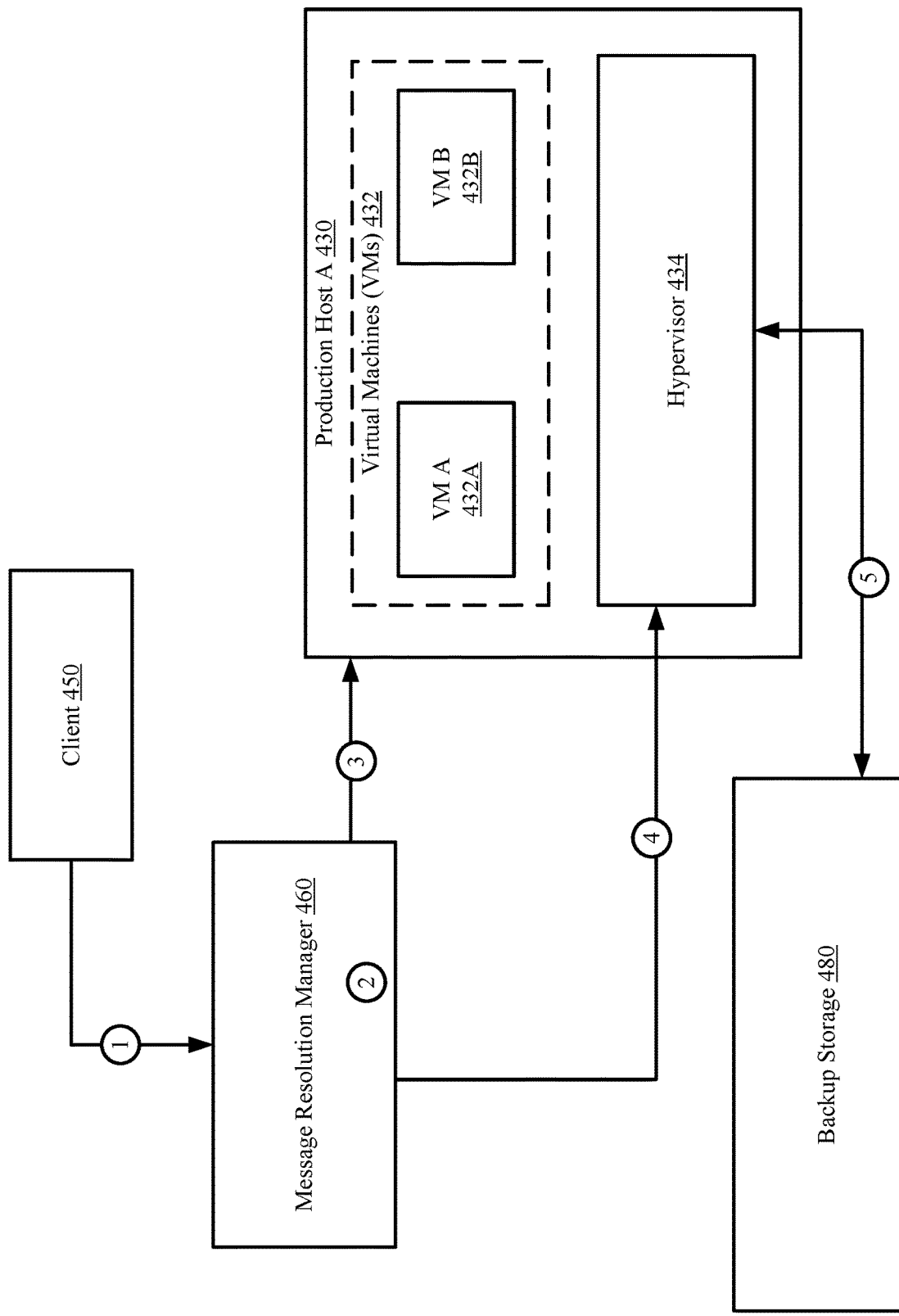

The following section describes an example. The example, illustrated in FIGS. 4A-4C, is not intended to limit the invention. Turning to the example, consider a scenario in which a message resolution manager is to resolve a set of error messages. Turning to the figures, FIG. 4A shows an error message repository (400) managed by the message resolution manager (not shown in FIG. 4A). The error message repository (400) may include 12 error messages. Each error message may specify a client, an error message identifier, an error message code, and a timestamp. The error messages may be illustrated in chronological order, with the error message of timestamp T1 being the earliest, and the error message with the timestamp T12 being the latest.

The message resolution manager may perform the method of FIG. 3A to manage the error messages prior to initiating an error resolution. Specifically, the message resolution manager may perform an error message consecutive deduplication on the error messages to obtain a set of deduplicated error messages. As illustrated in FIG. 4A, error messages with the error message identifier MA3 repeat three times. The error message with the earliest time timestamp may be kept while the latter two are deleted.

The resulting set of deduplicated error messages are grouped into message sequences based on the points in time in which error messages were deleted. Because the error messages of timestamps T4, T5, T8, T9, and T12 were deleted, there are three periods of times within which no error messages were deleted. Specifically, between T1-T3, no error messages were deleted, so messages MA1, MA2, and MA3 are grouped into a first message sequence (SQA); between T6-T7, no error messages were deleted, so MA4 and MA5 are grouped into a second message sequence (SQB); and between T10-T11, no error messages were deleted, so M6 and M7 are grouped into a third message sequence (SQC).

After the message sequences are generated, a sequence frequency track mapping is generated. FIG. 4B shows the sequence frequency track mapping (420). The sequence frequency track mapping (420) specifies a frequency for each error message code in each message sequence. For example, the error message code 8740 is specified two times for sequence SQA (in both MA1 and MA2).

A severity score is generated for each error message code based on a function using the following as inputs: the frequency of the corresponding error message code in the corresponding message sequence, the total number of error message codes, and the frequencies of the other error message codes in the message sequences. The severity scores are used to group the message sequences into clusters using a k-means clustering. The result of such clustering is two clusters. Cluster A includes message sequences SQA and SQC. Cluster B includes message sequence B. Based on the clustering generated, a high severity message sequence list is generated by selecting a message sequence from each cluster. The selection may be based on the message sequence in each sequence cluster with the most error messages. As such, message sequence SQA is selected for cluster A and SQB is selected for cluster B. As a result, the high severity message sequence list is populated with message sequences SQA and SQB.

FIG. 4C shows the example system. The example system includes a client (450), a message resolution manager (460), a production host (430), and a backup storage (480). The message resolution manager (460) obtains the initial set of error messages illustrated in FIG. 4A. The message resolution manager performs the method of FIGS. 3A and 3B as discussed above to obtain the high severity message sequence list [2]. After the high severity error message sequence list is generated, an error-resolution mapping is used to identify stored solutions to the errors of the message sequences in the high severity message sequence list. Message sequence SQA may include error codes 8740 and 1342.

Error message code 8740 of message sequence SQA is associated with virtual machine A (432A) and virtual machine B (432B) running low on allocated memory. The solution specified in the error-resolution mapping may be a memory flush into persistent storage. Error message code 1342 is associated with a backup operation failure. The backup operation failure may be caused by the lack of available memory. The specified solution includes restarting the backup operation after the memory has been made available. The message resolution manager (460) initiates the error message resolution of message sequence SQA by sending a request to the production host (430) to store any data in memory to persistent storage and to restart the backup operations of the virtual machines (432) in the production host (430) [3].

Error message code 9942 of message sequence SQB is associated with an application (not shown) in virtual machine A (432A) not responding. The specified solution for this error includes waiting until the application is responsive. Error message code 2457 includes a failed restoration of virtual machine A (432A). The resolution to this issue is to re-attempt the restoration after the application becomes responsive. The message resolution manager (460) initiates the error message resolution of message sequence SQB by sending a request to the hypervisor (434) of the production host to wait for the application to restart before performing the restoration [4]. The hypervisor (434), while waiting for the application to restart, obtains the backup of virtual machine A (432A) from the backup storage (480) storing the backup [5]. The restoration is re-attempted as requested.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve the efficiency of managing issues relating to a production host environment. Specifically, embodiments of the invention may improve the management of large numbers of error messages that may be difficult to resolve all at once or even in order without embodiments of the invention. Embodiments of the invention perform analysis on the large number of error messages to determine the most efficient resolution to the error messages. Embodiments of the invention may further include initiating the determined resolution.

Thus, embodiments of the invention may address the problem of inefficient use of computing resources. This problem arises due to the technological nature of the environment in which production host environments are executing.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a production host environment, the method comprising:
obtaining, by a message resolution manager, a plurality of error messages;
performing an error message consecutive deduplication on the plurality of error messages to obtain a plurality of deduplicated error messages;
generating a plurality of message sequences using the plurality deduplicated error messages;
applying a message sequence frequency algorithm to the plurality of message sequences to obtain a high severity message sequence list, wherein applying the message sequence frequency algorithm comprises:

generating a sequence frequency track mapping based on the plurality of message sequences;
generating, using the frequency track mapping, a severity score for each message code specified in each message sequence in the plurality of message sequences;
performing, using the severity scores, a k-means clustering evaluation for each message sequence to obtain a list of sequence clusters, wherein each sequence cluster specifies at least a portion of the plurality of message sequences; and
generating, based on the k-means clustering evaluation, the high severity message sequence list by specifying a message sequence in each sequence cluster in the list of sequence clusters; and
initiating an error message resolution on at least one message sequence specified in the high severity message sequence list.

2. The method of claim 1, further comprising:
updating an error-resolution mapping based on the high severity error message list.

3. The method of claim 2, wherein initiating the error resolution comprises using, after the updating, the error-resolution mapping to identify a resolution to an error message specified in the high severity message sequence list.

4. The method of claim 1, wherein an error message in the plurality of error messages comprises an error message identifier, a device identifier, an error message code, and a timestamp.

5. The method of claim 1, wherein the plurality of error messages is obtained from at least one selected from a group consisting of a client, a backup storage, and a production host.

6. A non-transitory computer readable medium comprising computer readable program code, which when executed by a computer processor enables the computer processor to perform a method for performing a backup operation, the method comprising:
obtaining, by a message resolution manager, a plurality of error messages;
performing an error message consecutive deduplication on the plurality of error messages to obtain a plurality of deduplicated error messages;
generating a plurality of message sequences using the plurality deduplicated error messages;
applying a message sequence frequency algorithm to the plurality of message sequences to obtain a high severity message sequence list, wherein applying the message sequence frequency algorithm comprises:
generating a sequence frequency track mapping based on the plurality of message sequences;
generating, using the frequency track mapping, a severity score for each message code specified in each message sequence in the plurality of message sequences;
performing, using the severity scores, a k-means clustering evaluation for each message sequence to obtain a list of sequence clusters, wherein each sequence cluster specifies at least a portion of the plurality of message sequences; and
generating, based on the k-means clustering evaluation, the high severity message sequence list by specifying a message sequence in each sequence cluster in the list of sequence clusters; and
initiating an error message resolution on at least one message sequence specified in the high severity message sequence list.

7. The non-transitory computer readable medium of claim 6, further comprising:
updating an error-resolution mapping based on the high severity error message list.

8. The non-transitory computer readable medium of claim 7, wherein initiating the error resolution comprises using, after the updating, the error-resolution mapping to identify a resolution to an error message specified in the high severity message sequence list.

9. The non-transitory computer readable medium of claim 6, wherein an error message in the plurality of error messages comprises an error message identifier, a device identifier, an error message code, and a timestamp.

10. The non-transitory computer readable medium of claim 6, wherein the plurality of error messages is obtained from at least one selected from a group consisting of a client, a backup storage, and a production host.

11. A system, comprising:
a processor; and
memory comprising instructions which, when executed by the processor, perform a method, the method comprising:
obtaining, by a message resolution manager, a plurality of error messages;
performing an error message consecutive deduplication on the plurality of error messages to obtain a plurality of deduplicated error messages;
generating a plurality of message sequences using the plurality deduplicated error messages;
applying a message sequence frequency algorithm to the plurality of message sequences to obtain a high severity message sequence list, wherein applying the message sequence frequency algorithm comprises:
generating a sequence frequency track mapping based on the plurality of message sequences;
generating, using the frequency track mapping, a severity score for each message code specified in each message sequence in the plurality of message sequences;
performing, using the severity scores, a k-means clustering evaluation for each message sequence to obtain a list of sequence clusters, wherein each sequence cluster specifies at least a portion of the plurality of message sequences; and
generating, based on the k-means clustering evaluation, the high severity message sequence list by specifying a message sequence in each sequence cluster in the list of sequence clusters; and
initiating an error message resolution on at least one message sequence specified in the high severity message sequence list.

12. The system of claim 11, further comprising:
updating an error-resolution mapping based on the high severity error message list.

13. The system of claim 12, wherein initiating the error resolution comprises using, after the updating, the error-resolution mapping to identify a resolution to an error message specified in the high severity message sequence list.

14. The system of claim 11, wherein an error message in the plurality of error messages comprises an error message identifier, a device identifier, an error message code, and a timestamp.

* * * * *